(No Model.)
W. WEST.
HEARTH FURNACE FOR TREATING ZINC ORES.
No. 445,124. Patented Jan. 20, 1891.
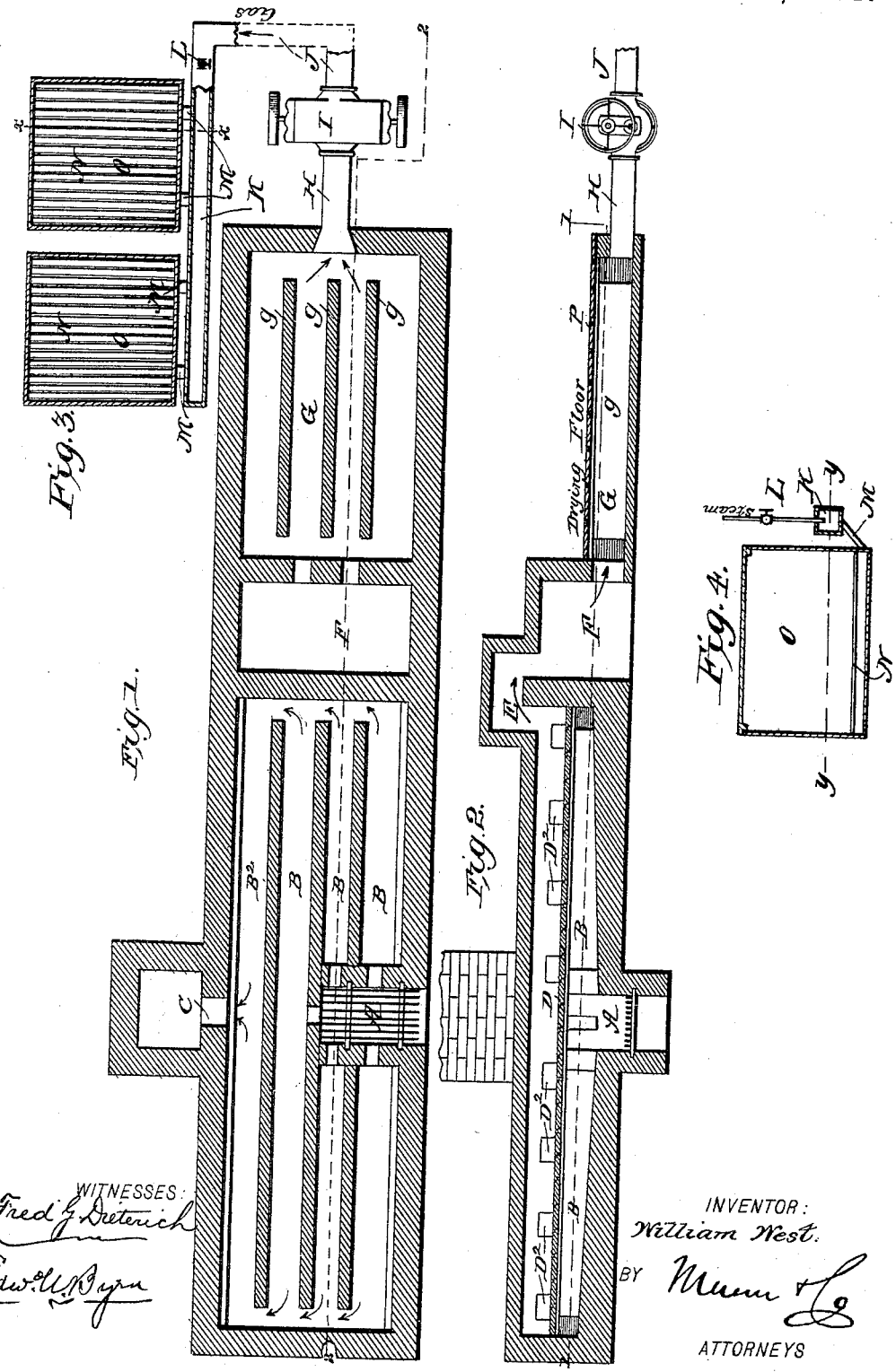

UNITED STATES PATENT OFFICE.

WILLIAM WEST, OF DENVER, COLORADO, ASSIGNOR OF ONE-HALF TO JOSEPH E. CLEMONS, OF SAME PLACE.

HEARTH-FURNACE FOR TREATING ZINC ORES.

SPECIFICATION forming part of Letters Patent No. 445,124, dated January 20, 1891.

Application filed November 30, 1889. Serial No. 332,102. (No model.)

*To all whom it may concern:*

Be it known that I, WILLIAM WEST, of Denver, Arapahoe county, and State of Colorado, have invented a new and Improved Furnace for Treating Zinc Ores, of which the following is a specification.

There are in many parts of this country, especially in the West and South, large bodies of mineral composed of zinc and lead sulphides carrying gold and silver, and which are almost valueless from the presence of zinc. The smelting for silver is difficult in the case of this combination and the lead hinders the use for smelting for zinc. Many schemes have been devised to save all the metals—zinc, lead, gold, and silver.

My invention consists in a new furnace and apparatus for working these ores in accordance with the following process: The ore—a combination of zinc blende and galena carrying some gold and silver—I first grind or crush to pass through a screen of thirty meshes to the inch, and then roast it in the furnace hereinafter described. The calcining is to be carried to the point that all the zinc is in the form of oxide. It is then slightly dampened and placed in a tank with a false bottom. The sulphurous-acid gas from the calcining of the ore is then forced under the false bottom in connection with steam and up through the ore till by test it shows that all the zinc is a soluble sulphite or in a condition to be treated with hot water. The solution of zinc salt is run into a tank to settle, and from the settling-tank is passed into a precipitating-tank, where a stream of ammonia-gas is passed through it and the zinc precipitated as hydrated oxide, which is washed, dried, and pressed and smelted in the usual way for metallic zinc. The ammonia-salt is received into a still and regenerated with lime. The lime, which is now a sulphate with a small percentage of ammonia, can be sold as a fertilizer. The residue in the ore-tank now contains all the lead, gold, and silver in the best condition for smelting in the usual way for the recovery of those metals.

Figure 1 is a horizontal section of the furnace, taken on line 1 1 of Fig. 2. Fig. 2 is a vertical section of the furnace, taken on line 2 2 of Fig. 1. Fig. 3 is a horizontal section of two tanks and their connections for treating the roasted ore with gas and steam, the view being taken on line $y\,y$ of Fig. 4. Fig. 4 is a vertical section of the same on line $x\,x$ of Fig. 3.

A is the fire-place in the center of the furnace.

B are the flues which carry the heat of the fire under the tile bed D, upon which the ore is placed. The fire passes each way under the bed by the front flues B and returns by the back flue $B^2$ to the outlet-flue C, which leads the chimney-stack.

The furnace-bed D, which is made of flanged tiles, has working-doors, (marked $D^2$,) through which the ore is charged and raked. The sulphurous-acid gas from the ore passing through the flue E enters the dust-chamber F, and from there goes to the flues G between partition $g$, which are covered with iron plates P, forming a drying-floor for the ore after it leaves the leaching-tanks. From these flues the gas passes to the pipe or pipes H, leading to the blower. I is this blower, which exhausts the gas from the furnace and forces it to the ore-tanks. From the blower the gas enters the pipe J, leading to the trunk K, Fig. 3. A steam-pipe L is connected to this trunk, and through this pipe steam is forced into and mixes with the gas in the trunk K. From the trunk K are short pipes M, which convey the steam and gas under the false bottoms N of the tanks O, where the ore is dampened and placed to be treated. When the ore is sufficiently acted upon, water is run upon the ore and the soluble zinc-salt leached out into a tank in the floor (not shown in drawings) and the zinc recovered therefrom by any of the ordinary methods.

In operating this furnace and apparatus a charge of ground ore is first placed upon the tile hearth D and the ore roasted till the zinc is in the form of oxide. This charge is then removed and placed upon the false bottom N of tanks O and dampened. A new charge of ore is then placed on the hearth D, and while it is being roasted the sulphurous-acid gas is drawn off by the blower and forced, in connection with steam, through the dampened ore in tanks O until the oxide of zinc is converted into soluble sulphite of zinc. This being removed by successive leachings of warm water, the remaining ore containing the other metals is taken out and put upon the drying-floor P, where the heat of the hot gases in transit serves to dry it for subsequent treatment in separation of the remaining metals. The heat abstracted by this drying of the wet ore also tends to cool the gases as they pass to the blower. The charge from the hearth D is then transferred to the tanks O and a new charge placed upon the hearth, and the triple operation of roasting the ore, drying the residual ores of the previous charge, and eliminating the zinc from the roasted ore in tanks O is simultaneously carried on with a great economy of working and very satisfactory results. By locating the fire-place of the furnace in the middle of the length of the furnace and to one side of the longitudinal axis the heat is equably distributed over the whole structure, and less than half the labor is required to operate it, from the fact that the charges of ore can remain in place till finished, and there is no need to shift the position of the ore in the furnace to secure uniform roasting.

The drying-floor P is arranged at the end of the furnace and at or near the ground-level, so as to bring its level to a convenient position for charging ore thereupon and removing the same, and for the further purpose of spreading out the flues G in a horizontal plane, so that the gases may be cooled. The blower I serves to overcome the frictional retardation of the gases in flues G and the resistance which they meet in rising through the ore in the tanks O.

Having thus described my invention, what I claim as new, and desire to secure by Letters Patent, is—

1. The furnace comprising a roasting-chamber provided with a floor of tiling, flues B B², longitudinally arranged beneath the floor and communicating with each other at their ends, and a fire-place A, located midway the ends of the furnace beneath the floor and at one side of the longitudinal center of the same and communicating with the flue B, whereby the hot gases of combustion are caused to pass longitudinally outward from the fire-place through flues B and inwardly through flues B² to the stack, substantially as shown and described.

2. The furnace comprising a roasting-chamber provided with a floor of tiling, flues B B², longitudinally arranged beneath the floor and communicating with each other at their ends, and a fire-place A, located midway the ends of the furnace beneath the floor and at one side of the longitudinal center of the same and communicating with the flues B, in combination with the chamber F, arranged at the end of the furnace and communicating with the space above the tile floor, and the drying-floor arranged at the end of chamber F and composed of partitions $g$, with flues G, communicating with chamber F, and covering plates or tiles P, substantially as shown and described.

3. The combination, with a roasting-furnace, of a drying-floor arranged at the end of the furnace and at or near the ground-level, the said drying-floor consisting of tiles or plates P and sustaining-partitions $g$, forming flues communicating with the furnace, the leaching-tanks O, with false bottom N, a blower I, with pipes H J, interposed between the flues of the drying-floor and the false bottom of the leaching-tanks to draw the gases from the flues of the drying-floor and force them beneath the false bottom, and a steam-pipe connected with the gas-pipe leading beneath the false bottom, substantially as shown and described.

WILLIAM WEST.

Witnesses:
 JAS. FLETCHER, Jr.,
 KENNETH C. MYERS.